United States Patent [19]

Uzumcu et al.

[11] 4,162,728

[45] Jul. 31, 1979

[54] FASTENER ASSEMBLY

[75] Inventors: Ali I. Uzumcu, Elk Grove Village; Elmer J. Thorsen, Jr., Wood Dale; Robert M. Demkowicz, Cicero, all of Ill.

[73] Assignee: Duo-Fast Corporation, Franklin Park, Ill.

[21] Appl. No.: 858,835

[22] Filed: Dec. 8, 1977

[51] Int. Cl.² .......................................... B65D 73/02
[52] U.S. Cl. ................................................ 206/345
[58] Field of Search .................... 85/18; 206/343–347; 227/136

[56] References Cited

U.S. PATENT DOCUMENTS

3,756,391 9/1973 Keck et al. ............................ 206/343

FOREIGN PATENT DOCUMENTS

1478829 2/1969 Fed. Rep. of Germany .......... 206/346

Primary Examiner—Stephen Marcus
Attorney, Agent, or Firm—Mason, Kolehmainen, Rathburn & Wyss

[57] ABSTRACT

An assembly of fasteners for use in a power fastener driving tool includes a number of fasteners having elongated shanks held in spaced apart relation by a pair of strips of frangible plastic material. Each strip includes a series of sleeves holding shanks of the fasteners and a series of spacer segments integrally joining the sleeves. The strip closer to the fastener heads is weaker than the strip closer to the fastener points. As an end fastener is driven from the assembly, the sleeve of the weaker strip associated with the next fastener to be driven is permitted to fracture, while the sleeve of the stronger strip remains intact.

17 Claims, 7 Drawing Figures

U.S. Patent    Jul. 31, 1979    4,162,728
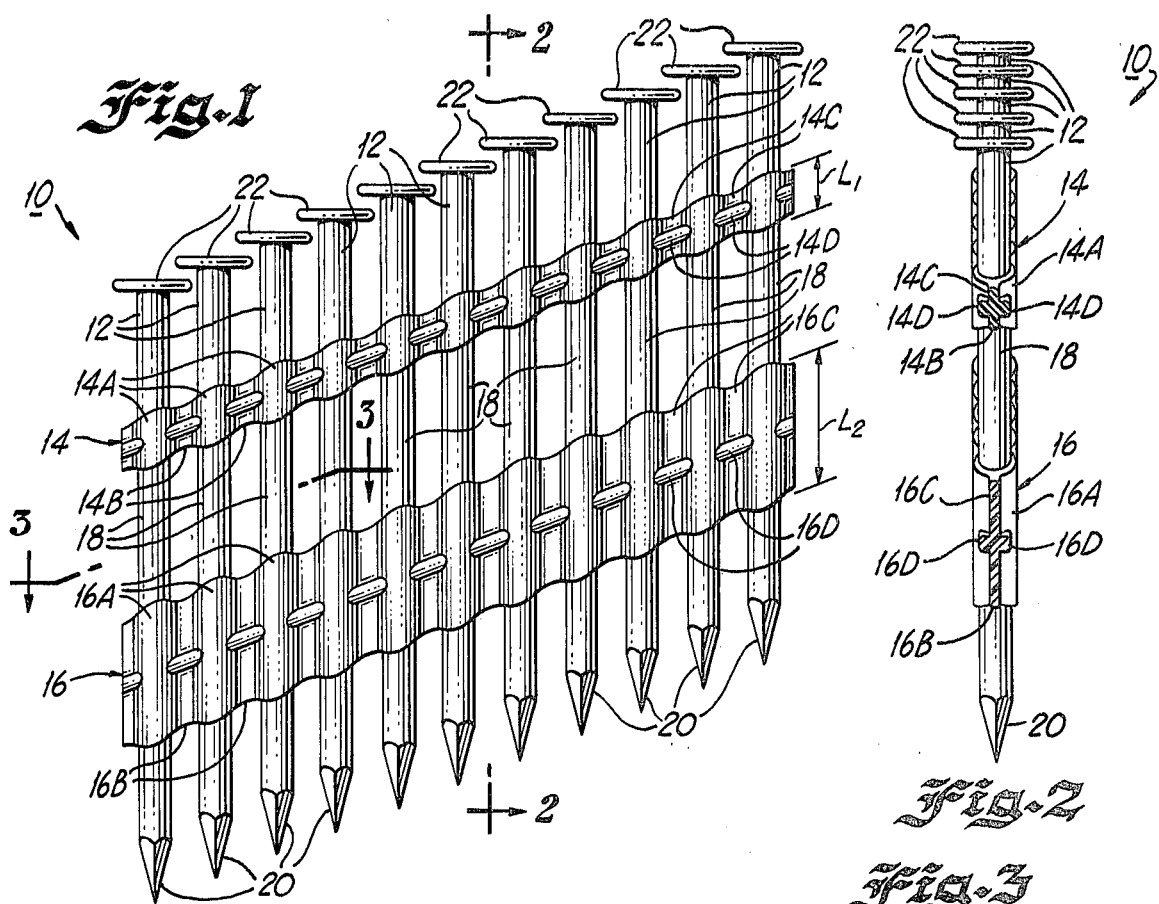
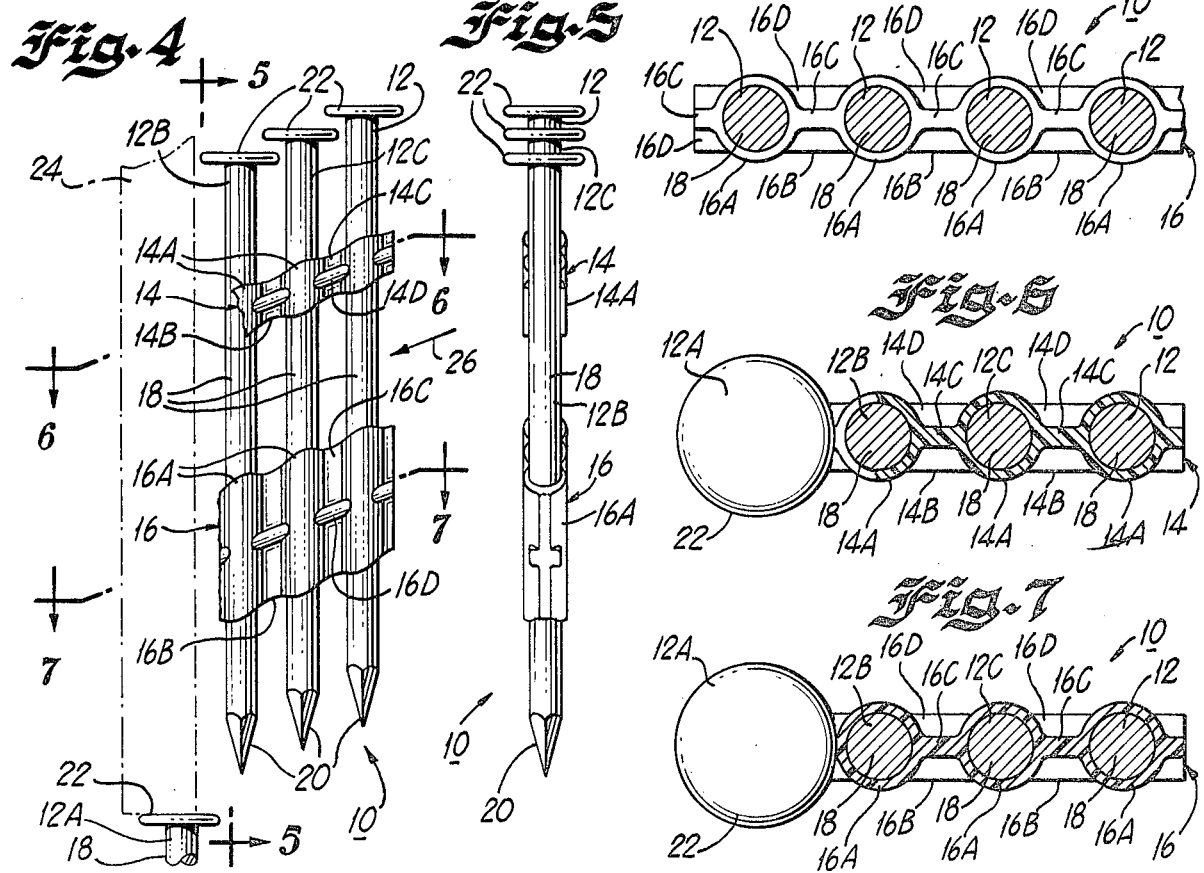

FASTENER ASSEMBLY

The present invention relates to an assembly of fasteners for use in a power fastener driving tool.

Power operated tools, such as pneumatic fastener driving tools, are widely used for driving elongated fasteners such as nails. Fasteners for use in such tools are typically provided in a fastener assembly wherein the fasteners are held in collation for convenient handling, feeding and driving. In one type of assembly which enjoys wide use, a number of fasteners such as nails having elongated shanks are held in a common plane in spaced apart relation to one another by a pair of strips of frangible plastic material extending transversely across the shanks.

A typical power fastener driving tool in which such fastener assemblies are used includes a magazine into which the assembly of fasteners is inserted. Within the magazine, the assembly is pushed toward a drive position by conventional structure such as a spring biased pusher element. At the drive position, a power operated driver member such as a pneumatically driven plunger serially separates end fasteners from the assembly in an axial direction and drives the fasteners toward and into a workpiece. Examples of power fastener driving tools of this character are disclosed in U.S. Pat. Nos. 3,615,049—Obergfell et al and 3,498,517—Novak.

Fastener assemblies for use with tools of this character typically include a pair of spaced apart frangible strips formed of extruded plastic material. Conventionally, the strips are identical to one another and/or have similar fastener holding characteristics in that they are of the same general size and strength. Examples of such fastener assemblies are disclosed in U.S. Pat. Nos. 3,212,632—Baum et al; 3,342,659—Baum et al; 3,463,304—Gallee et al; and 3,756,391—Keck et al.

In known fastener assemblies of this type, the frangible plastic strips include a series of sleeves which receive and hold the fastener shanks in spaced apart relationship. Extending between the sleeves are a series of integral spacer segments. The conventional approach in the design and use of such assemblies is to form the strips so that when an end fastener is driven from the strip, the spacer segments extending between the driven nail and the next nail fracture to release the driven nail. It has in the past been felt to be necessary and desirable that the sleeves associated with the next nail remain intact for securely holding the next nail in position until driven.

Nail assemblies of the type to which the invention relate must meet rigorous requirements in storage, handling and use. After manufacture, the assemblies may be stored at widely varying temperatures from well below freezing to extremely high temperatures for extended periods of time. Nevertheless, it is necessary that the frangible strips of the assembly be sufficiently strong to avoid breakage during shipment and handling. Moreover, when an assembly is loaded into the magazine of a fastener driving tool, the strips must resist breakage when a spring loaded pusher element is engaged against the end of the assembly, often with a sharp impact.

Strip breakage can be avoided by increasing the strength of the strips, for example by using more plastic material to form a thicker or wider strip. This expedient however causes other problems because when an end nail is driven from the strip, the strip must be sufficiently frangible so that driving of the fastener from the strip is not unduly impeded. As a result of the above factors, heretofore in the design of a fastener assembly it has been necessary to attempt to strike a balance between the requirements of unimpeded fastener driving and resistance to breakage of the assembly. It has not been possible to achieve consistently satisfactory solutions to both problems in a single fastener assembly.

Among the important objects of the present invention are to provide a fastener assembly exhibiting ample strength and resistance to breakage; to provide an assembly wherein individual fasteners can be easily driven from the assembly; to provide a fastener assembly of the type including a pair of frangible plastic strips wherein individual fasteners are supported and guided during the driving operation and yet wherein the strips do not impede separation of individual fasteners from the strip; and to provide a fastener assembly overcoming the disadvantages of those used in the past.

In brief, the above and other objects and advantages of the present invention are realized through the provision of an assembly of elongated and spaced apart fasteners for use in a power fastener driving tool wherein one end of the assembly is pushed toward a drive position in which a fastener at the other end of the assembly is driven axially from the assembly toward a workpiece by a driver member. The assembly includes a plurality of fasteners having elongated shanks disposed in a common plane in spaced apart relation with one another, and further includes a strip construction extending transversely across the shanks for holding the fasteners in the spaced apart relation.

The strip construction of the present invention includes first and second spaced apart strips of frangible plastic material. The two strips are disposed respectively closer to the heads and to the points of the fasteners. Each strip includes a series of spaced apart hollow sleeves for receiving and holding the fastener shanks, and a series of spacer segments extending between and integrally joining the sleeves.

In accordance with an important feature of the present invention, the two strips do not exhibit the same strength and resistance to breaking during driving of an end fastener. Rather, the strip closer to the heads of the fasteners is substantially weaker than the strip adjacent the points of the fasteners. As a result, the sleeve of the first strip surrounding the next fastener is encouraged to fracture as an end fastener is driven, while the stronger sleeve of the second strip remains intact. Ample support for the next to be driven fastener is provided by the intact sleeve in combination with the spacer segment associated with the first strip. Moreover, the fracturing of the sleeve of the first strip assures that the driving of the next fastener is not impeded by the strip construction. The intact sleeve located closer to the fastener point provides a reliable guiding and supporting function as the next fastener is driven from the assembly.

The present invention together with the above and other objects and advantages thereof may be best understood from consideration of the embodiment of the invention illustrated in the drawings, wherein:

FIG. 1 is a side view of a fastener assembly constructed in accordance with the present invention;

FIG. 2 is a sectional view taken along the line 2—2 of FIG. 1;

FIG. 3 is a sectional view on an enlarged scale taken along the line 3—3 of FIG. 1;

FIG. 4 is a side view of a segment of the assembly of FIG. 1 illustrating an end fastener being driven from the assembly;

FIG. 5 is an end view of the segment of FIG. 4 taken from the line 5—5 of FIG. 4;

FIG. 6 is a sectional view of the segment of FIG. 4 on an enlarged scale and taken along the line 6—6 of FIG. 4; and FIG. 7 is a sectional view on an enlarged scale of the segment of FIG. 4 taken along the line 7—7 of FIG. 4.

Having reference now to the drawings, and initially to FIGS. 1-3, there is illustrated a fastener assembly generally designated by the reference numeral 10 and constructed in accordance with the principles of the present invention. The assembly 10 includes a number of similar fasteners 12 held in assembled relationship by a strip construction including a pair of strips 14 and 16 extending throughout the length of the assembly 10.

In the illustrated embodiment of the invention, the fasteners 12 comprise common nails each having an elongated shank 18, a point 20 and a head 22. It should be understood that the principles of the present invention are applicable to assemblies of fasteners of other types including many types of nails and analogous elongated fasteners. As used herein, the term "point" is intended to refer to that end of the fastener which first enters the workpiece, while the term "head" is intended to designate the opposite end of the fastener which is engaged by a driver member in a fastener driving tool.

As shown in FIG. 1, the fastener assembly 10 is somewhat abbreviated in form for purposes of convenience in illustration. In practice, an assembly of fasteners for use in a fastener driving tool would include, for example, in the neighborhood of thirty or so fasteners.

The specific orientation of the nails 12 in the assembly 10 is dictated by the construction of the power fastener driving tool with which the assembly 10 is adapted to be used because different magazine constructions and feed systems can require different fastener orientations. In the assembly 10 illustrated in the drawing, the nails 12 are held relatively rigidly in a common plane by the strips 14 and 16. The shanks 18 of the nails are spaced apart from and generally parallel with one another. The heads 22 of the nails 12 are along a line at one side (herein sometimes called the upper side) of the assembly 10, and the point 20 are aligned along the opposite side (herein sometimes called the lower side) of the assembly. The heads 22 are partially overlapped in stepped relation to one another. If desired, however, the nail heads 22 may be arranged in side-by-side, coplanar relationship.

In many respects, the upper strip 14 and the lower strip 16 are similar to one another, and corresponding reference characters are used to designate similar elements of the two strips while only the upper strip 14 is described in detail.

Strip 14 includes a series of hollow sleeves 14A, one for the shank 18 of each nail 12. Each sleeve 14A surrounds and grasps the corresponding nail shank 18. A series of spacer segments 14B extend between the sleeves 14A in order to provide the desired spacing between the shanks 18. Each spacer segment 14B is integral at both ends with the surrounding sleeves 14A. In the strip configuration shown in the drawings, the spacer segments 14B include a web portion 14C from both sides of which ribs 14D project.

In the use of the assembly 10, it is necessary for substantial rigidity to exist so that the nails 12 can be individually fed into a drive position by applying a pushing or compressive force to the opposite end of the assembly. The rigidity of the assembly 10 must be such that the individual nails 12 remain in their proper orientation without compression, buckling or fanning due to excessive flexibility of the strips 14 and 16. In these respects, the assembly 10 is not analogous to coilable fastener assemblies wherein relatively flexible strips are used to interconnect successive fasteners.

The material of the strips 14 and 16 must not only be relatively rigid, but also must be frangible to the end that individual end nails may be successively driven from the assembly 10 in a power fastener driving tool. A suitable material is a plastic material such as polymerized propylene, commonly known as polypropylene. Satisfactory results are obtained with a talc-filled grade having a range of twenty percent to sixty percent. Other types of fillers, such as calcium carbonate, could be used and it is also possible to use no filler, or to use copolymers of propylene with other olefins such as ethylene.

In manufacture of the assembly 10, the individual fasteners 12 are arranged in the desired orientation, and the plastic material may be formed into strips 14 and 16 and applied to form the assembly 10 by the method claimed in U.S. Pat. No. 3,342,659—Baum et al. In a typical arrangement, the plastic material is heated and extruded over opposite sides of the progression of fasteners 12 between forming rollers which form the strips 14 and 16.

In accordance with an important feature of the present invention, the upper strip 14—i.e., the strip closer to the heads 22 of the nails 12—is significantly weaker than the lower strip 16—i.e., the strip closer to the points 20. This difference in strength of the strips 14 and 16 may be accomplished in various ways, as by the use of materials of different strength or otherwise. In the embodiment of the invention illustrated in the drawings, the difference in strength is achieved by using the same material for both strips 14 and 16 and by making the strips of different size.

More specifically, as can best be seen in FIG. 1, the upper strip 14 has an average height which is significantly less than the average height of the lower strip 16. In FIG. 1 the approximate average height of the upper strip 14 is designated by the reference character L1, while that of the lower strip 16 is designated by the reference L2. It can be seen that in the illustrated arrangement, L2 is between two and three times longer than L1. As a result, the upper strip 14 is substantially weaker than the lower strip 16.

In order to achieve the difference in height of the strips 14 and 16, in the manufacture of the assembly 10 substantially more material is used in forming the lower strip 16. More specifically, between two and three times more material in terms of weight per unit length is used for the lower strip 16 than for the upper strip 14. However, if desired, other approaches could be used for relatively weakening the upper strip 14, as for example by providing regions of reduced cross section, or the like.

The assembly 10 of the present invention including strips 14 and 16 of substantially different strengths represents a significant departure from assemblies of this type used heretofore including those disclosed in the patents referred to above. The conventional approach is to make the pair of strips of equal strength. Due to variances in manufacturing conditions including such variables as extrusion temperature and pressure conditions and the like, some variance in strip strength may have been encountered in the past. However, normal manufacturing techniques are easily able to maintain both strips within approximately ten to twenty percent of one another with regard to parameters such as height of the strip, thickness of the strip and the like. Variables of this magnitude are not effective reliably to achieve the advantages of the present invention.

More specifially, while it is not necessary to have a width difference in the neighborhood of 2:1 or 3:1 as illustrated in the accompanying drawings, it is desirable in practicing the present invention that the weaker strip have a height L1 not greater than seventy-five percent of the height L2 of the stronger strip. A differential of at least this great a magnitude is effective to achieve the results of the present invention.

The numerous important advantages flowing from the strip construction of the present invention may be best appreciated with reference to FIGS. 4-7. These figures illustrate a segment of an assembly 10 of the present invention from which an end nail 12A is being driven toward a workpiece by means of a driver shown in FIG. 4 in broken lines and designated by the reference numeral 24. It should be understood that after complete driving of the end nail 12A, in a subsequent drive stroke the next nail designated as 12B will be driven from the assembly 10. Moreover, in a power fastener driving tool, the assembly 10 is pushed toward the drive position in alignment with the driver 24 by a compressive force applied in the direction represented by the arrow 26 in FIG. 4.

In accordance with the present invention, the strips 14 and 16 fracture in a different fashion as end nail 12A is driven from the assembly 10 by the driver 24 due to the relative weakness of the upper strip 14. As the driver 24 removes the end nail 12A in its axial direction, the sleeve 14A surrounding the next to be driven nail 12B fractures. In contrast, the substantially stronger sleeve 16A of the lower strip 16 remains intact. Consequently, after driving of the end nail 12A, the strip construction associated with the nail 12B takes substantially the form illustrated in FIGS. 4-7.

It should be understood that the exact configuration of the fractured ends of the strips 14 and 16 may vary considerably from nail to nail as a large number of nails 12 are driven from assemblies 10. For example, the upper sleeve 14A will not always fracture precisely in the manner illustrated in FIGS. 4-7. In some instances more or less of the sleeve 14A will remain. In any case, some or all of the associated spacer segment 14B extending away from nail 12B will remain.

The manner in which the strips 14 and 16 fracture during driving of end nail 12A provides important advantages. One advantage is that partial fracturing of the upper sleeve 14A provides for relatively uninhibited axial movement of the next nail 12B when it is driven. Since the driver 24 need not completely fracture a strip or completely overcome the strength of an intact sleeve until relatively late in its drive stroke, problems of incomplete driving of nails, especially into hard materials, which have been experienced with strip constructions known in the past are avoided.

Another important advantage of the present invention arises from the fact that the sleeve 16A of the relatively strong lower strip remains intact on the next to be driven nail 12B. This intact lower sleeve supports and guides the nail during the drive stroke. As a result, until the head 22 of the nail reaches the lower strip 16, the nail is reliably held in the proper orientation and is prevented from tipping or tilting or becoming skewed. This is particularly important in that period during the travel of the nail before the point 20 becomes well embedded into a workpiece. After this point, the workpiece itself serves to maintain proper orientation of the nail.

Another advantage of the assembly 10 is that even though the upper sleeve 14A is fractured, nevertheless the remaining portion of the sleeve 14A, if any, and the remaining associated spacer segment 14B supports the shank 18 away from the shank of the third nail 12C of the assembly. Consequently, even though a compressive force is applied in the direction of the arrow 26, the shanks 18 of the nails 12B and 12C are maintained in their desired spaced apart parallel relation.

Yet another important advantage of the assembly 10 is that even though one strip 14 is relatively weak, the other strip 16 is relatively strong. Consequently, in combination with one another, the two strips act in concert to provide ample strength and rigidity for the assembly 10. The stronger lower strip 16 of substantial height provides a very important function in preventing breakage of the assembly 10 in shipping and handling of the assembly, even after long periods of time in storage under adverse conditions. Furthermore, the strength of the lower strip 16 is such that fracture of the assembly 10 is avoided even when the assembly is subjected to impact by a pusher member in the magazine of a power fastener driving tool.

In achieving resistance to breakage of the assembly 10 the relatively weak upper strip 14 also performs a function of assisting in maintaining the fasteners 12 in alignment. Although most of the strength is provided by the lower strip 16, nevertheless the limited strength of the upper strip 14 is such as to prevent excessive torsional stress in the lower strip 16 as might result if only a single strip were used.

Further, the breaking or fracture of the upper strip 14 forces the head 22 of the nail 12 to move into contact with the wall of the drive track in the driving tool, whereby the nail head 22 is properly located for engagement by the nail driver. This relative freedom of movement tends to compensate for tolerance build-ups, both in the tool and the fastener assembly 10.

While the invention has been described with reference to details of the illustrated embodiment, such details are not intended to limit the invention as defined in the following claims.

What is claimed and desired to be secured by Letters Patent of the United States is:

1. In a fastener assembly of the type including a pair of frangible strips holding a plurality of fasteners with their shanks parallel and with their heads and points disposed at opposite sides of the assembly; the improvement in accordance with which the strip adjacent the points of the fasteners is substantially stronger than the strip adjacent the fastener heads, said strips being formed of extruded plastic material, and said stronger strip having an overall average height significantly larger than that of said weaker strip.

2. An assembly of elongated and spaced apart fasteners for use in a power fastener driving tool wherein one end of the assembly is pushed toward a drive position in which a fastener at the other end of the assembly is driven axially from the assembly toward a workpiece by a driver member; said assembly comprising:

a plurality of fasteners having elongated shanks disposed in a common plane in spaced apart relation with one another; and strip means extending transversely across said shanks for holding said fasteners in said spaced apart relation;

each said fastener including a first end adapted to be engaged by the driver member and a second end adapted to enter the workpiece;

said strip means including first and second spaced apart strips of frangible material disposed respectively closer to said first and second fastener ends;

each said first and second strip including a series of spaced apart hollow sleeves receiving and holding said shanks and a series of spaced apart spacer segments extending between and integrally joining said sleeves;

and the improvement characterized by the sleeves of said first strip being substantially weaker than the sleeves of said second strip for encouraging fracturing of only the sleeve of the first strip surrounding the next to be driven fastener during driving of the end fastener.

3. The assembly of claim 2, said strips being formed of similar plastic material.

4. The assembly of claim 3, said first strip being formed of substantially less plastic material per unit length than said second strip.

5. The assembly of claim 2, said first strip being substantially smaller in height than said second strip.

6. The assembly of claim 5, said second strip having a height less than about three-quarters of the height of said first strip.

7. The assembly of claim 6, said second strip having a height in the range of about one-half to one-third the height of said second strip.

8. The assembly of claim 4, the material of said first strip comprising less than about three-quarters of the material of said second strip in weight per unit length.

9. The assembly of claim 8, the material of said first strip being in the range of about one-half to one-third of the material of said second strip in weight per unit length.

10. An assembly of headed fasteners from which individual fasteners are separated by a fastener driving member in a power fastener driving tool, the assembly comprising:

a plurality of fasteners having their shanks in parallel, side-by-side relation;

the heads of said fasteners lying in a line at one side of the assembly and the points of said fasteners lying in a line at the opposite side of the assembly; and a pair of strips of plastic material disposed in generally parallel lines intersecting the fastener shanks and holding the fasteners in assembly;

each strip including a plurality of holding portions, one said holding portion engaging and supporting the shank of one said fastener;

each strip also including a plurality of connecting portions, one said connection portion extending between each adjacent pair of said holding portions;

and the improvement comprising:

the strip adjacent said line of heads being significantly weaker than the strip adjacent said line of points for encouraging fracturing of only the holding portion of the strip adjacent said line of heads surrounding the next to be driven fastener during driving of the end fastener.

11. An assembly of fasteners adapted to be serially driven in a power fastener driving tool and comprising:

a number of similar fasteners each having a shank, a head and a point; and frangible holding means for supporting the fasteners with their shanks spaced apart and with their heads and points disposed at opposite sides of the assembly;

said holding means including first and second strips of frangible material along which the fastener shanks are secured at spaced apart locations;

said first strip intersecting said fastener shanks adjacent the fastener heads and said second strip intersecting said fastener shanks between said first strip and the fastener points;

the width of said first strip being substantially less than the width of the second strip to render said first strip substantially weaker than said second strip.

12. An assembly of elongated and spaced apart fasteners for use in a power fastener driving tool wherein one end of the assembly is pushed toward a drive position in which a fastener at the other end of the assembly is driven axially from the assembly toward a workpiece by a driver member; said assembly comprising:

a plurality of fasteners having elongated shanks disposed in a common plane in spaced apart relation with one another; and strip means extending transversely across said shanks for holding said fasteners in said spaced apart relation;

each said fastener including a first end adapted to be engaged by the driver member and a second end adapted to enter the workpiece;

said strip means including first and second spaced apart strips of frangible material disposed respectively closer to said first and second fastener ends;

each said first and second strip including a series of spaced apart hollow sleeves receiving and holding said shanks and a series of spaced apart spacer segments extending between and integrally joining said sleeves;

and the improvement characterized by the sleeves of said first strip being substantially weaker than the sleeves of said second strip for encouraging fracturing of only the sleeve of the first strip surrounding the next to be driven fastener during driving of the end fastener, said strips being formed of similar plastic material, said first strip being formed of substantially less plastic material per unit length than said second strip.

13. The assembly of claim 12, the material of said first strip comprising less than about three-quarters of the material of said second strip in weight per unit length.

14. The assembly of claim 13, the material of said first strip being in the range of about one-half to one-third of the material of said second strip in weight per unit length.

15. An assembly of elongated and spaced apart fasteners for use in a power fastener driving tool wherein one end of the assembly is pushed toward a drive position in which a fastener at the other end of the assembly is driven axially from the assembly toward a workpiece by a driver member; said assembly comprising:

a plurality of fasteners having elongated shanks disposed in a common plane in spaced apart relation with one another; and strip means extending transversely across said shanks for holding said fasteners in said spaced apart relation;

each said fastener including a first end adapted to be engaged by the driver member and a second end adapted to enter the workpiece;

said strip means including first and second spaced apart strips of frangible material disposed respectively closer to said first and second fastener ends;

each said first and second strip including a series of spaced apart hollow sleeves receiving and holding said shanks and a series of spaced apart spacer segments extending between and integrally joining said sleeves;

and the improvement characterized by the sleeves of said first strip being substantially weaker than the sleeves of said second strip for encouraging fracturing of only the sleeve of the first strip surrounding the next to be driven fastener during driving of the end fastener, said first strip being substantially smaller in height than said second strip.

16. The assembly of claim 15, said second strip having a height less than about three-quarters of the height of said first strip.

17. The assembly of claim 16, said second strip having a height in the range of about one-half to one-third the height of said second strip.

* * * * *